No. 741,060. PATENTED OCT. 13, 1903.
F. McKEAN.
PORTABLE PRESS FOR HAY, &c.
APPLICATION FILED JAN. 13, 1903.
NO MODEL. 2 SHEETS—SHEET 1.
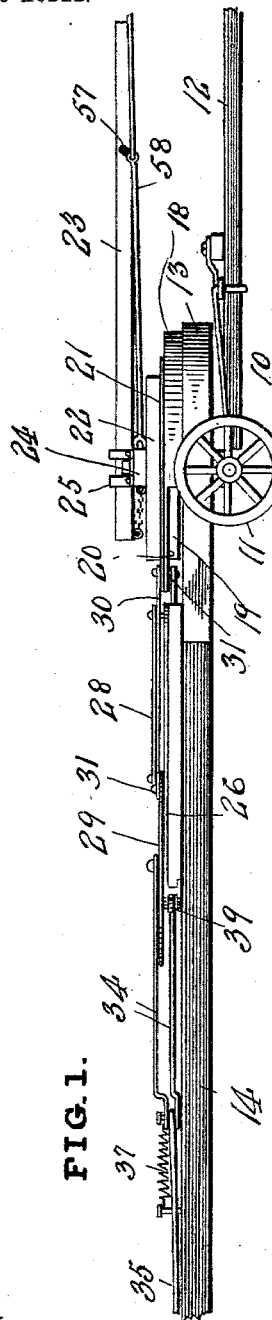
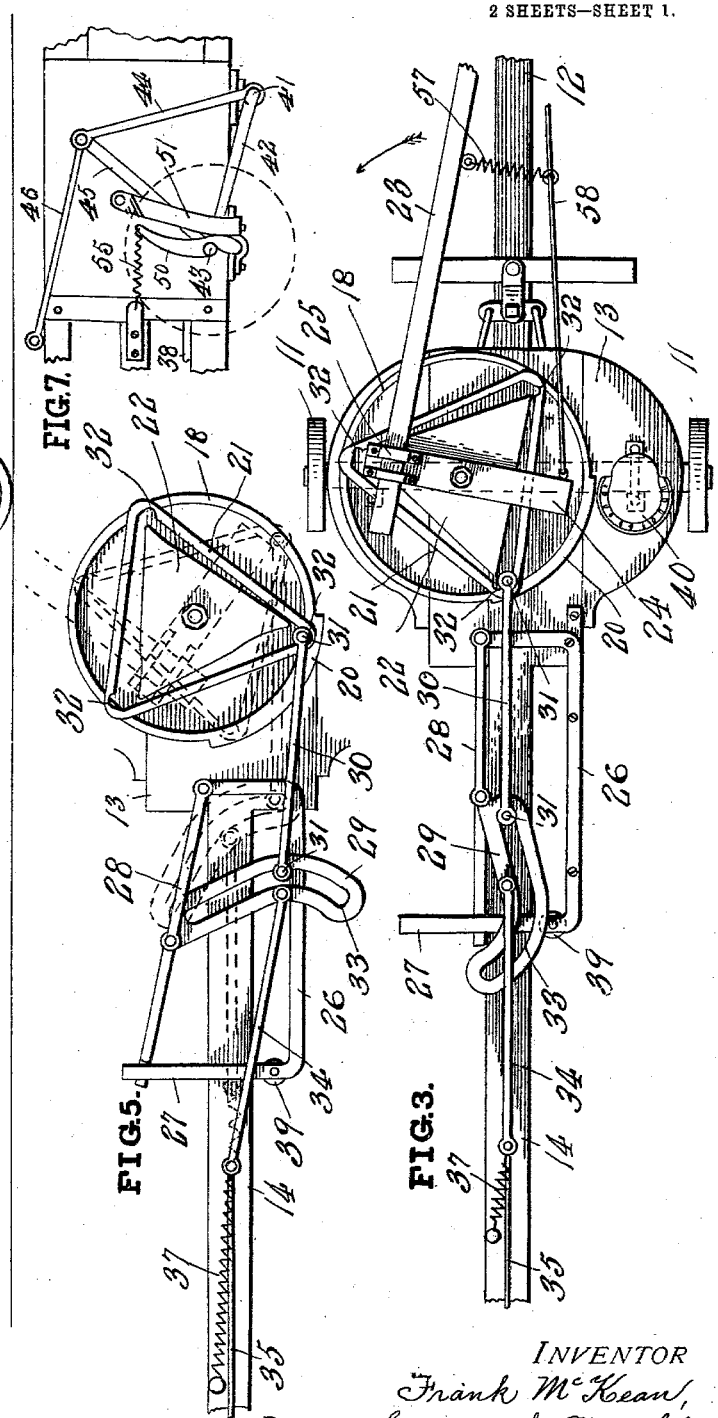
WITNESSES:
Chas. N. Davies.
Chas. S. Mason.
INVENTOR
Frank McKean,
BY Stebbins & Wright.
Attorneys.

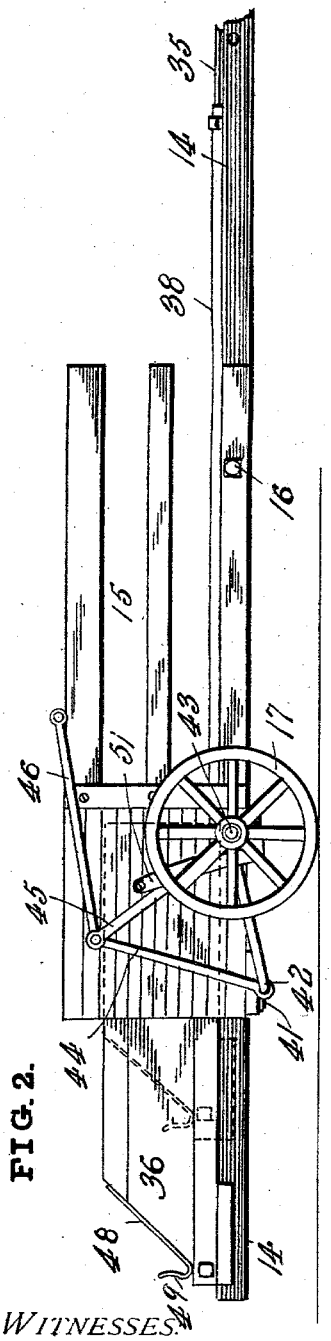

No. 741,060. Patented October 13, 1903.

UNITED STATES PATENT OFFICE.

FRANK McKEAN, OF GUFFEY, TEXAS.

PORTABLE PRESS FOR HAY, &c.

SPECIFICATION forming part of Letters Patent No. 741,060, dated October 13, 1903.

Application filed January 13, 1903. Serial No. 138,874. (No model.)

*To all whom it may concern:*

Be it known that I, FRANK McKEAN, a citizen of the United States, residing at Guffey, in the county of Jefferson and State of Texas, have invented new and useful Improvements in Portable Presses for Hay and other Materials, of which the following is a specification.

My invention relates to portable hay and other presses, and has for its objects, first, an improved power-transmission and lever device for pressing or forcing the hay or other material into the box or frame of the press, and, second, in means for either raising or lowering the box on or off the wheels, so that it may be in elevated position for transportation or on the ground when in operation; and for these purposes the invention consists in the combination and arrangements of parts, as hereinafter set forth and claimed.

In the accompanying drawings, which form a part of this specification, Figure 1 represents a side view of the front portion of a portable hay-press embodying my invention. Fig. 2 represents a side view of the rear portion thereof. Fig. 3 represents a top or plan view of parts shown in Fig. 1. Fig. 4 represents a top or plan view of the parts shown in Fig. 2. Fig. 5 represents a top or plan view of some of the parts shown in Fig. 3, the operating parts of the power mechanism being shown in different position from that shown in Fig. 3. Fig. 6 represents a side view of the rear portion of the device in lowered position. Fig. 7 represents a side view of the rear portion of the device opposite from that shown in Fig. 6, the frame being in raised position.

In the drawings like numerals designate similar parts.

The numeral 10 designates the front truck, on which is supported the power mechanism, said truck having the wheels 11 and tongue 12. Detachably mounted on said truck is the platform 13, being rigidly connected with a rearwardly-extending bar or reach 14 for attachment thereto of the box or frame 15 of the press proper. The said frame is adjustable longitudinally on said bar and secured in said adjusted position by means of the pin or bolt 16, passing through holes in said frame and bar. The said frame is supported on wheels 17 by mechanism hereinafter described, so as to be adapted to be readily lowered from or raised on the same, as may be desired, in the management of the device.

Firmly secured to the upper face of the platform 13 is a circular ring or flange 18, having a cut-away portion or opening 19 in one side thereof, with an overhanging flange 20. Loosely supported and guided on the ring 18 is a crank 21, consisting of a triangular plate or frame having an opening therein in which operates the approximately triangular-shaped retaining-block 22, having sides adapted to contact with the inner edges of the crank and connected with the sweep 23 by means of the cross-bar 24 and the keepers 25. The block 22 is pivoted to the platform 13 at the center of the ring 18 and is provided at each of its edges with a curved or recessed portion, so as to more readily prevent any binding of the parts, as hereinafter explained. The said block has a slight lateral movement within the crank 21, but is adapted in its rotation to rotate the latter. The elevating-bar 24 serves to raise the sweep above the other parts of the mechanism, so as to have it out of the way of the latter in its rotary movement. The keepers 25 permit a longitudinal adjustment of the sweep therein and also its ready removal when desired. The power mechanism consists of an angular guideway 26, secured to the platform 13 and the reach 14, and has one of its arms 27 slotted for the play therein of connected parts of the mechanism. Pivoted to the guideway 26 is a lever 28, having its free end movable in said slotted arm 27 and stopped in each direction by the end walls thereof.

Pivotally connected with the lever 28 is a slotted lever-arm 29, movable on the guideway 26. The lever-arm 29 is connected with the crank 21 by means of the link 30, which carries at its ends the antifriction-rollers 31, one of which rides on the inner edge of said crank, resting during a portion of the movement thereof in a catchway or recessed portion 32 thereof. Said recess serves to hold the roller therein until it passes the line of the link 30, when it is automatically released therefrom. The other roller 31 rides in the slot 33, which extends nearly its entire length in the lever-arm, and bears against the wall thereof, so as to swing or rotate the same on the guideway 26. To the lever-arm, about midway its length, is pivotally secured one end of a connecting arm or link 34, the other end being connected with the rod 35, detachably connected at its rear end with the draw-head 36 of the frame of the press. To the link 34 and to the reach 14 is connected a contractile spring 37, adapted to return the operative parts of the lever-arm to their initial or right-line position, as shown in Fig. 3, and the draw-head to the position shown in Fig. 4.

The rod 35 is protected by a tubular shield 38, fastened to the reach.

An antifriction-roller 39 is mounted in the end of the walls of a slot in the arm 27 for the guidance of the lower member of the link 34.

On the platform 13 is mounted a seat 40 for the driver.

The frame or box 15 is detachably mounted on the wheels 17 in the following manner: Pivotally secured to the under sides of the box at 41 is a crank-axle 42, having forwardly-extending portions with outwardly-projecting ends 43, on which ends the wheels 17 are mounted. Pivotally connected to the horizontal portion of the crank adjacent to the sides of the box and to the ends 43 are the bars 44 and 45, also pivotally connected together at their upper ends. A loop 46 is pivoted to the upper connected ends of the said bars and has a horizontal portion 47, adapted at times to rest on the top of the box, as shown in Fig. 2, and at other times on the incline 48 on the rear of the draw-head or abut against the stop 49 at the lower end of said incline for a purpose hereinafter explained.

50 designates latches or catches located on opposite sides of the frame and operatively connected by a cross-bar, so as to move in unison, and are adapted to hold the ends 43 of the axles in depressed position, so that the frame 15 is elevated on the wheels 17. Keepers 51 extend upwardly along the sides of the frame to keep the bars 44 and 45 close to the sides of the frame. One of the keepers is shown in Fig. 6 as curved, forming a guide for an end 43, the latch in said figure being of less length than that on the opposite side of the frame. (Shown in Fig. 7.) The latter latch has a curved face, on which an end 43 rides, and to its upper end is secured the retaining-spring 55, which keeps the latches normally in engagement with said ends 43 and the frame in raised position.

The manner of operating the device is as follows: While transporting it or moving it from place to place, both front and rear portions are raised on the trucks or wheels, as shown. The rear part, however, is moved near or toward the front, being adjustable on the reach and secured thereto by a pin 16. While only one opening is shown for the pin or bolt 16, it is understood that similar openings may be provided in the reach for the purpose stated. On arriving at the place for work the front wheels are sunk in the ground or the truck is removed from the front portion and the platform 13 placed upon the ground. The rear part or frame 15 is then detached by removing the bolt 16 and run out to near the end of the reach and again secured thereto by bolt 16. The box or frame is then lowered to the ground in the following manner: The loop 46, which had previously been supported on the top of the box, is swung over to the dotted position shown in Fig. 6, and power is applied to the sweep, which causes the draw-head 36 to enter the box 15 far enough for the rod 47 to engage the stops 49. More power being applied to the sweep the bars 44 45 and the axle are rotated forwardly and the ends or spindles 43 disengaged from the latches 50. The latches are then thrown back and the sweep slowly turned backwardly, the draw-head also moving rearwardly, allowing the ends 43 to move up the keepers 51 and the box to be lowered by gravity to the ground.

The box or frame 15 may be of ordinary construction to receive the hay or other material to be pressed, and the same is not specifically claimed, as any ordinary and well-known construction may be employed having an opening 54 in its top to receive the hay. Power being applied to the sweep 23, so that it is moved in the direction of the arrow, Fig. 3, the crank 21 is rotated on the ring 18, moving the parts from the position shown in Fig. 3 to the position shown in Fig. 5, the roller 31 of the link 30 being held in a recess 32' of the crank, the lever-arm and link 34 causing the rod 35 to draw the draw-head 36, with the hay in front of the same, into the front portion of the frame 15. When the link 30 is in the opposite end of the lever-arm from that shown in Fig. 3, the further movement of the parts causes the roller 31 to slip from the recess 32, whereupon the spring 37 draws the parts back to the position shown in Fig. 3 and the draw-head to the position shown in Fig. 4. Further movement of the sweep in the direction of the arrow repeats the operation described.

It will be observed that the leverage increases as the lever-arm 29 revolves, so that it is greater when the draw-head has partly compressed the hay or other material than when the lever-arm 29 occupies the position shown in Fig. 3, in which latter position very little power is required to move the draw-head against the loose material.

When it is desired to remove the device, the loop 46, which during the process of baling rests on the frame, is again lowered on the incline 48, so as to engage the stop 49. The sweep is operated to draw in the draw-head, with the stop 49 pushing on the loop 46. This by means of the bars 44 and 45 causes the ends 43 to swing on their pivots, riding down the curved faces of the catches and keeper, thereby lifting the frame on the wheels until they reach the recess on the latches, when the spring 55, controlling the latches, holds the latter in place, so that the frame is held in elevated position on the wheels. The frame is then adjusted toward the front truck, which has been replaced under the platform 13, and the device is ready for transportation. By having the ends 43 outwardly extending the frame can be raised or lowered between the wheels without interfering therewith.

Guys or rods 58 may connect the outer ends of the sweep 23 with the bar 24, so that the draft on the sweep will be on both sides of the pivot of the block.

Having thus fully described my invention, what I desire to claim and secure by Letters Patent is—

1. A portable press having a platform, a crank movable thereon, a retaining-block with a sweep for operating said crank, a press-frame with draw-head, a lever-arm connected with said crank by a link, a rod directly connected with said draw-head and with said lever-arm by a link, and a spring connected with said last-mentioned link for moving said lever-arm opposite to its movement by said crank, said parts being combined substantially as described.

2. A portable press having a platform with a crank movable thereon, a retaining-block with a sweep for operating said crank, a draw-head, a lever-arm movable on a guideway, a link connecting said lever-arm and crank, a rod connected to said draw-head, a link connecting said rod and lever-arm and a contractile spring connected to said lever-arm for moving the latter in a direction opposite to its movement by the crank, said parts being combined substantially as described.

3. In a portable press, a platform with a guideway thereon, an angular crank movable on said guideway, a rotative retaining-block with operative means mounted on said platform and adapted to rotate said crank, a pivoted lever-arm having a link connection with said crank, a draw-head with a rod having a link connection with said lever-arm, and a returning-spring for said lever-arm, said parts being combined substantially as described.

4. A platform with a ring thereon, an angular crank movable on said ring, a retaining-block within said crank and pivoted to said platform and adapted to rotate said crank, means to rotate said block, a pivoted lever, a slotted lever-arm pivoted to said lever, a link having ends working in said crank and lever-arm, a draw-head with connecting-rod, a link pivotally connected to said rod and lever-arm, and a returning-spring for said lever-arm, said parts being combined substantially as described.

5. A platform with an angular crank movable thereon, a rotatable block within said crank for operating the same, a pivoted slotted lever-arm, a link having ends freely working in said lever-arm and crank, a draw-head with a connecting-rod, a link pivoted to said rod and to said lever-arm, and a returning-spring for said lever-arm, said crank having recesses at its corner on the inner edges thereof to receive rollers on said connecting-link, said parts being combined substantially as described.

6. The combination in a portable press, of power mechanism located upon a platform, rod 35, and draw-head 36; said power mechanism having a pivoted lever 29, a link 30 with an end movable relative to the lever-arm, and means uniting the rod 35 and the lever-arm; whereby the leverage of the mechanism is increased as the sweep is moved forwardly.

7. The combination with a box 15, crank-axle pivoted to the under side of the box and having ends 43, bars 44, 45, secured to the crank-axle on each side of the box, a loop 46 pivoted to bars 44, 45, draw-head 36 having a stop 49 and said draw-head movable in the box, and latches 50 pivoted to the box and adapted to engage the crank-axle, of power operating mechanism and means uniting the same to the draw-head, whereby the power mechanism may be employed to lower and raise the box.

8. The combination with the box 15 open at the top, of the crank-axle pivoted to the box and having ends to receive wheels, pairs of bars 44, 45, secured to the axle on each side of the box and located at an angle to each other, loop 46 pivoted at its ends to the bars 44 45, movable draw-head 36 having a stop 49, latches 50 to engage the axle, keepers 51, a front platform, power operating mechanism in connection with the platform, and means uniting the power mechanism with the draw-head.

9. The combination with a box 15 open at the top, of a draw-head 36 movable horizontally within the box, a rod 35 secured to the draw-head, a block 22 pivoted upon the front platform, a crank surrounding the block and in loose connection therewith, a link 30 having one end movable on the crank, means uniting link 30 to rod 35, means for rotating block 22, and means for retracting rod 35 and the draw-head.

10. A portable press having a platform, a retaining-block, an angular crank loosely engaging and movable with the block, a sweep for rotating the block and crank, a press-frame and box, a draw-head movable in the box, a pivoted lever-arm, a link connecting the angular crank and lever-arm and each end of the link movable, a rod connecting the draw-head and lever-arm, and means for retracting the draw-head, rod and lever-arm when they have reached the limit of their forward travel and are released from positive engagement with the angular crank.

In testimony whereof I affix my signature in presence of two witnesses.

FRANK McKEAN.

Witnesses:
GEOR. COBLE,
ALICE E. YOUNG.